Inventor:
Arthur C. Mueller
By Robert F. Miehle
Atty.

Feb. 13, 1962  A. C. MUELLER  3,020,814
CAMERA
Filed June 8, 1959  10 Sheets-Sheet 2

Inventor:
Arthur C. Mueller
By Robert F. Michler
Atty.

Feb. 13, 1962  A. C. MUELLER  3,020,814
CAMERA
Filed June 8, 1959  10 Sheets-Sheet 3

Inventor:
Arthur C. Mueller
By Robert F. Miehle, Jr.
Atty.

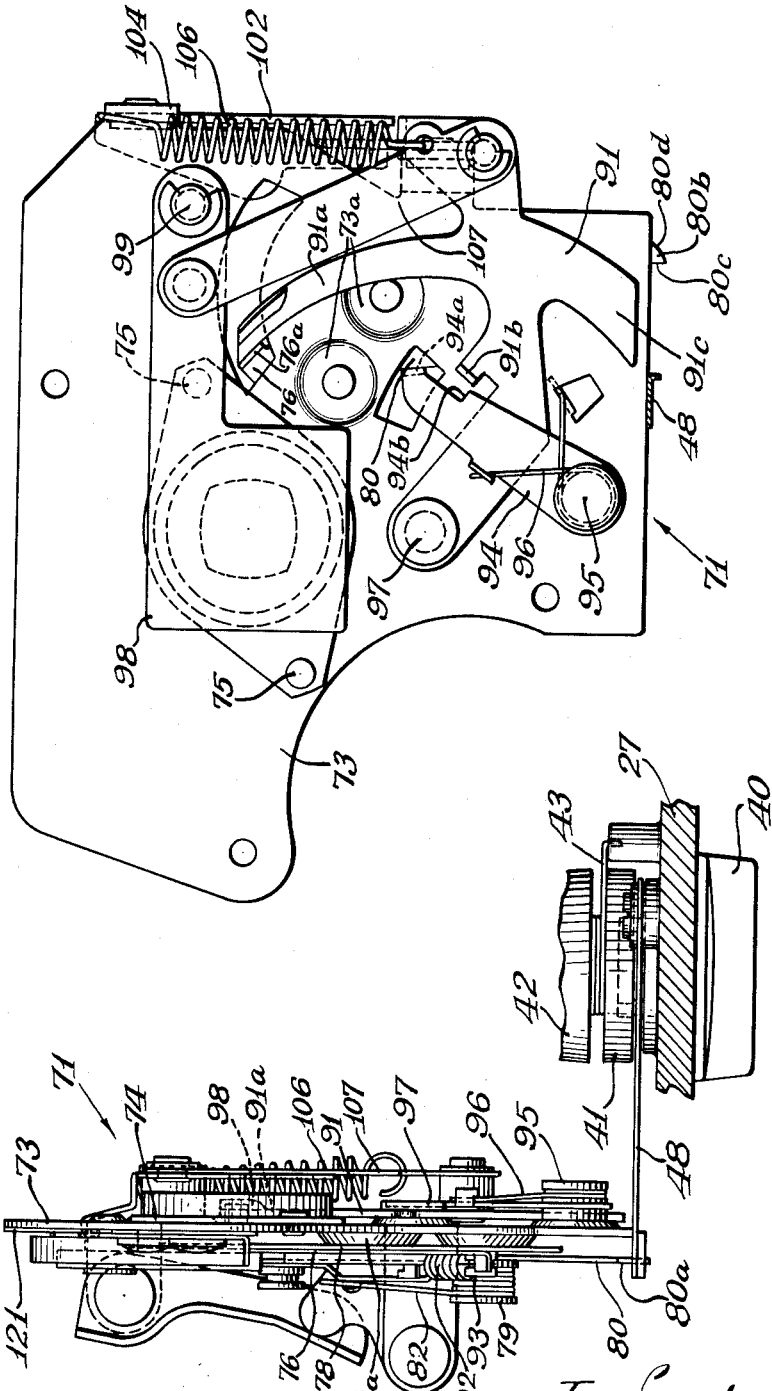

Feb. 13, 1962 A. C. MUELLER 3,020,814
CAMERA
Filed June 8, 1959 10 Sheets-Sheet 5

Inventor:
Arthur C. Mueller
By Robert F. Miehle, Atty.

Feb. 13, 1962 A. C. MUELLER 3,020,814
CAMERA
Filed June 8, 1959 10 Sheets-Sheet 7

Inventor:
Arthur C. Mueller
By Robert F. Miehle Atty.

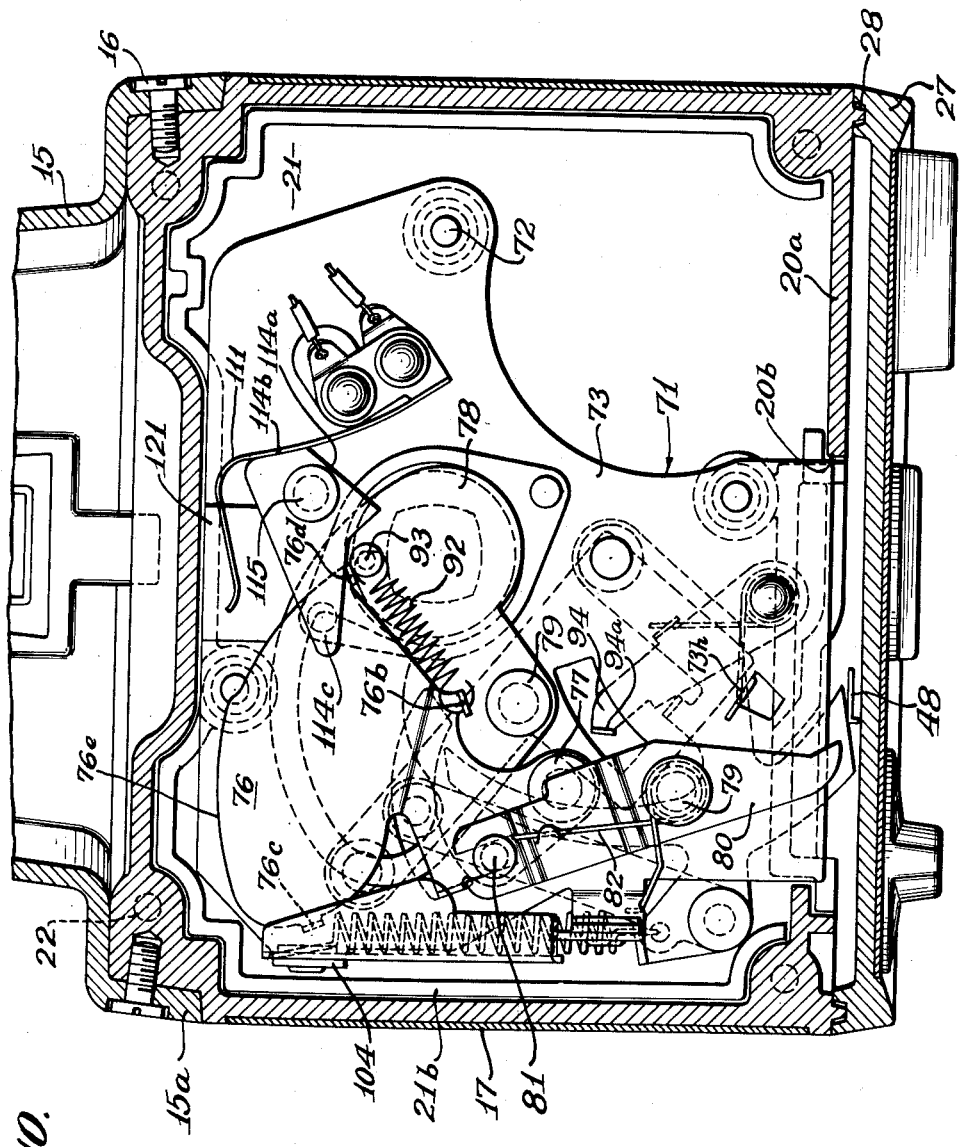

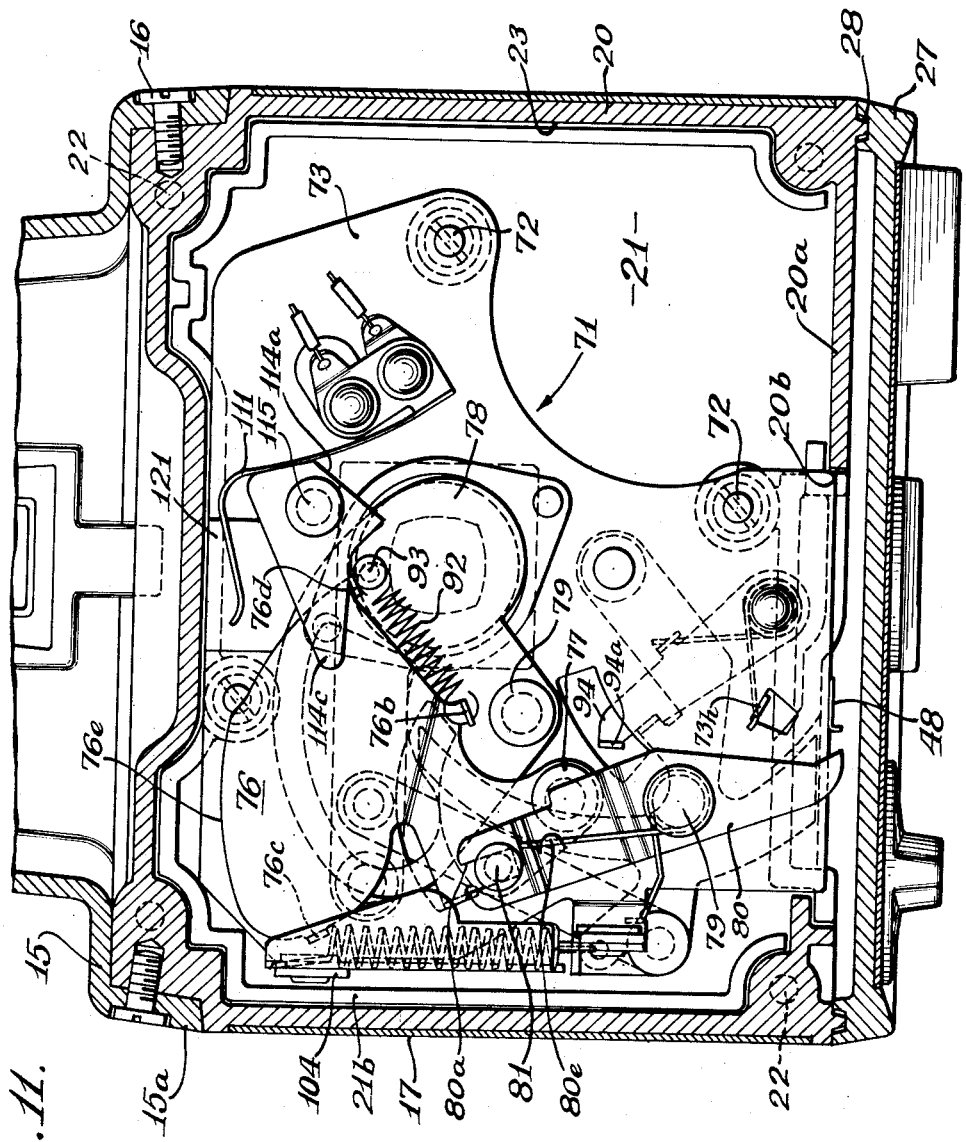

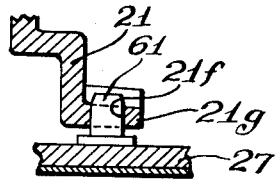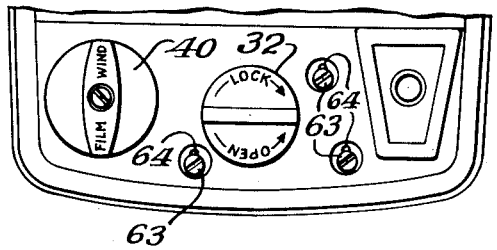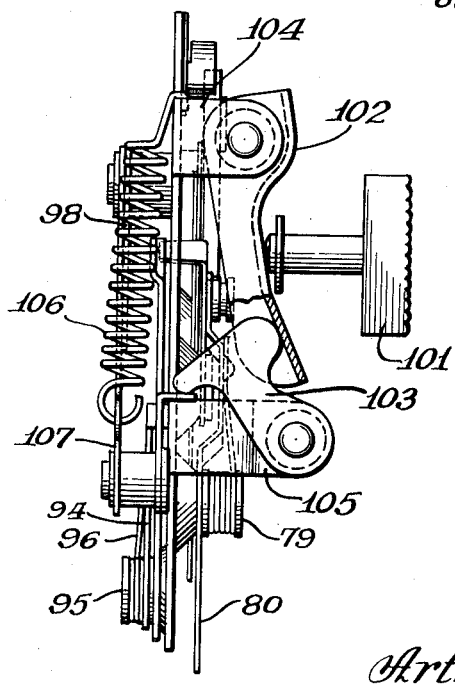

United States Patent Office 3,020,814
Patented Feb. 13, 1962

3,020,814
CAMERA
Arthur C. Mueller, Maine Township, Cook County, Ill., assignor to Bell & Howell Company, Chicago, Ill., a corporation of Illinois
Filed June 8, 1959, Ser. No. 818,619
2 Claims. (Cl. 95—11.5)

This invention relates to a camera, and more particularly to a shutter and flash control for a flash camera.

An object of the invention is to provide a new and improved shutter and flash control for a camera.

Another object of the invention is to provide a new and improved actuating mechanism for a camera.

A further object of the invention is to provide a new and improved cover latch in a camera.

Another object of the invention is to provide a new and improved structure for effecting focus in a camera.

Further objects and features of the invention may be obtained from the following detailed description of a camera forming a specific embodiment thereof, when read in conjunction with the appended drawings, in which:

FIG. 4 is a fragmentary, partially sectional side elevation view of a shutter assembly and combined film-winding and shutter resetting mechanism of the camera shown in FIG. 1;

FIG. 5 is a rear elevation view of the the shutter assembly;

FIG. 10 is a view similar to FIGS. 8 and 9 and illustrating the shutter at the end of its operation but before the manual actuator has been released;

FIG. 11 is a view similar to FIG. 10 after the manual actuator has been released;

FIG. 12 is an enlarged, fragmentary, vertical sectional view taken along line 12—12 of FIG. 8;

FIG. 13 is a fragmentary bottom plan view of the camera shown in FIG. 1; and

FIG. 14 is a partially sectional view of the manual actuating mechanism of the camera shown in FIG. 1.

Figure 1:
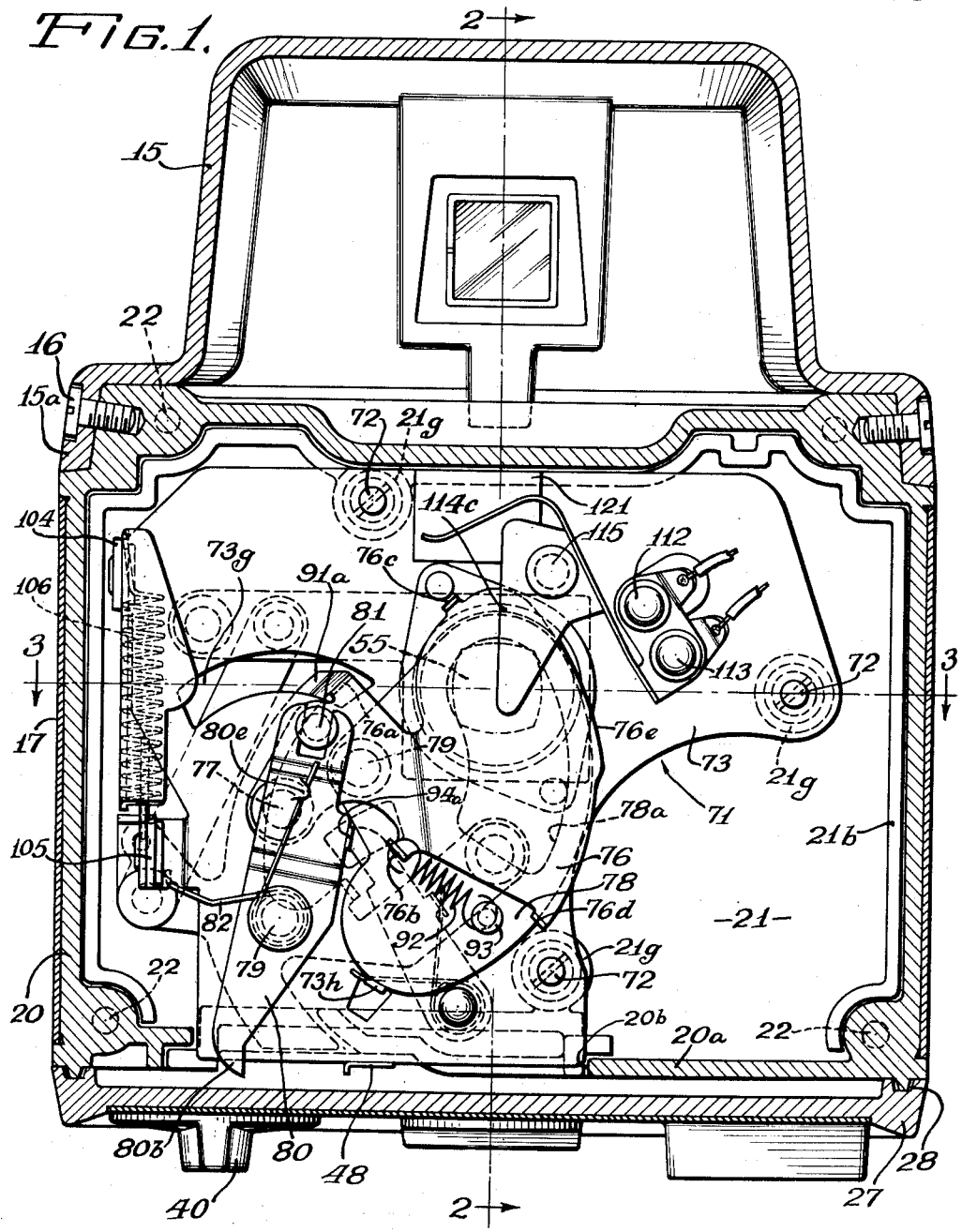
FIG. 1 is a vertical sectional view of a camera forming one embodiment of the invention.

The invention provides a camera having a shutter assembly unit including a mounting plate carrying an overcenter shutter mechanism and removably mounted on the frame of the camera. The shutter mechanism has a front blade and a rear blade mounted pivotally on the mounting plate and interconnected by an overcenter spring, and a spring pressed actuating and reset lever is coupled by a pin and slot connection to the front blade. The lever drives the front blade to a position opening the light path and then the overcenter spring moves the rear blade to a position closing the light path. During the travel of the front blade, the blade contacts a contact of a flash unit to start current to a flash bulb, and then near the end of the travel of the front blade, the front blade moves a flash latch to move the contact out of engagement therewith. The shutter is cocked by manual actuation of the film transport mechanism, and as the front blade comes to a position covering the light path, the front blade actuates the flash latch to allow the contact to be moved back into the path of the front blade in its next actuating stroke. Behind the shutter unit there preferably is provided a compartmentizing wall having an aperture in the light path and a safety shutter blade on the mounting plate and adapted to be swung by the shutter actuator away from the aperture. A removable bottom cover carries a spool holder and film frame thereon which is adjustable relative to the bottom plate to precisely locate the film in focus. Preferably there is provided a turning knob on the bottom plate pressing against a spring arm of a hook latch to move the hook latch over a pin on the wall of the camera to secure the bottom plate to the camera.

Referring now in detail to the drawings, the camera shown therein includes a generally cup-shaped front casing member 20 secured to a vertical compartmentizing wall or partition 21 of cast metal by screws 22 (FIG. 1) to form a closed shutter and exposure control compartment 23. A rear casing member 24 of cast metal fits around a ledge 21a on the partition to form a light trap therewith, the front casing member forming a light trap with a ledge 21b. A viewfinder tunnel or casing 15 of plastic is cup-shaped and fits against and over the casing members 20, 21 and 24 and is secured thereto by screws 16. Rim portion 15a of the tunnel 15 fits over reduced upper end portions of the casing members 20 and 24 and blends with side walls thereof. Decorative panels 17 of leather or plastic also are provided on the members 20 and 24. The tunnel 15 supports viewfinder lenses 18 and 19 therein.

The casing member 24 and the wall 21 form a film compartment 25 open at the bottom and are secured together by screws 26. A bottom plate or cover 27 of cast metal is removably secured to the casing members 20 and 24 with a light trapping joint 28 formed therebetween. To lock the bottom cover 27 to the casing members 20 and 24, a hook 29 is swung over a pin 30 on the wall 21 by a cam 31 (FIG. 7) formed on a manually operable knob 32. The hook 29 is pivotally mounted on a pin 33 mounted on a film holding frame 34. The hook has integral therewith a cross arm 29a from which project a spring follower arm 29b and a rigid follower arm 29c, both follower arms being integral with the cross arm and body portion of the hook 29 which is formed of sheet metal. Both follower arms engage the end or face cam 31 with the arm 29b being resilient. The knob 32 is limited to one-half a turn relative to the cover 27 by a projection 32a on the knob 32 and shoulder 27a and 27b at the end of a groove 27c in the cover 27. The hook makes a wedge fit with the pin 30 which is directly above the pin 33 so that pulling downwardly on the bottom cover does not tend to cam the hook loose. The cam 31, in less than the one-half turn of the knob with which the cam is integral, forces the hook tightly over the pin 30 and then, during the remainder of movement of the cam and knob, merely flexes the spring follower arm 29b. The frame 34 has slots 34a and 34d therein to permit free movement of the follower arms 29b and 29c.

The bottom cover 27 also carries rotatably a film-winding knob 40 keyed to disc 41 and spool seat 42, and a one-way spring 43 permits rotation of the elements 40, 41 and 42 only in a film-winding direction. The seat 42 receives a takeup spool 44 in keyed relationship, and the spool 44 is held on the seat by a forked spring clip 45 riveted to the frame and also holding a film supply spool 46 on a fixed spool seat 47 molded integrally with the frame 34. The disc 41 has a cam slot 41a formed therein fitting over a pin 48a (FIG. 6) of a resetting or cocking lever 48 pivotally mounted by screw 49 on the bottom cover 27.

Figure 3:
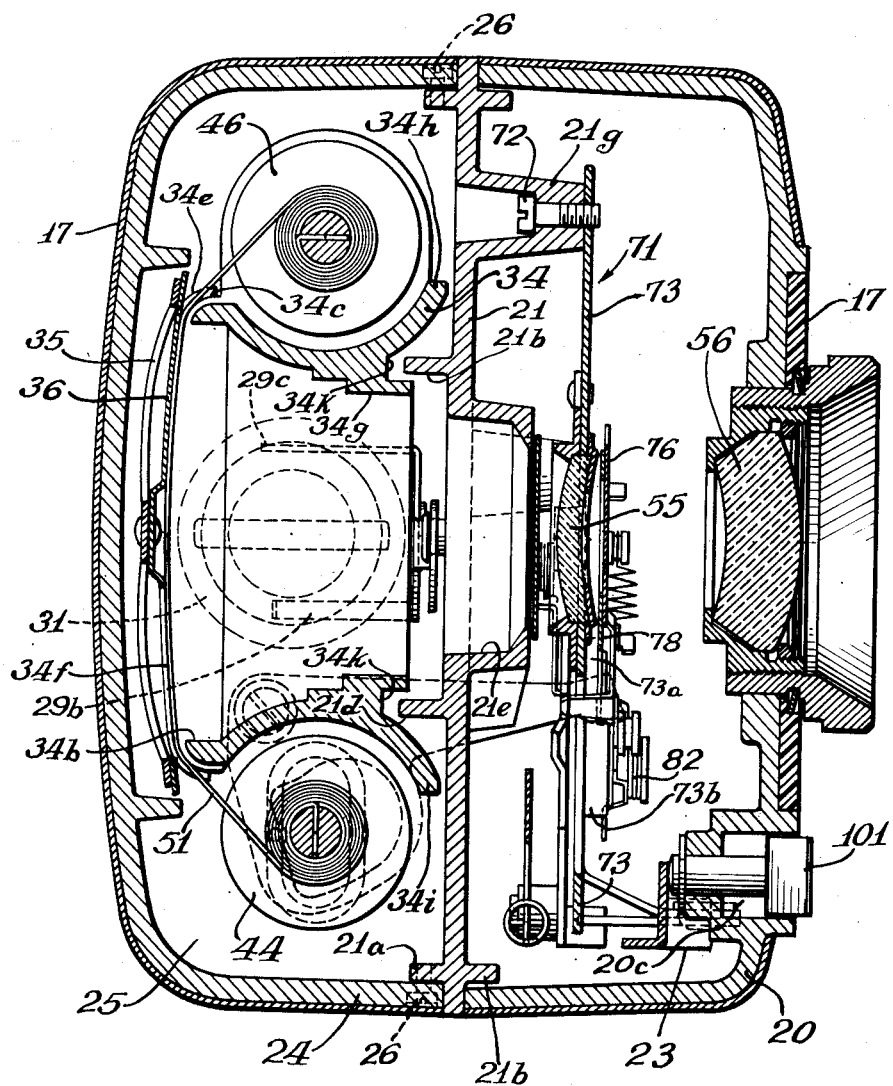
FIG. 3 is a horizontal sectional view taken along line 3—3 of FIG. 1.
Figure 6:
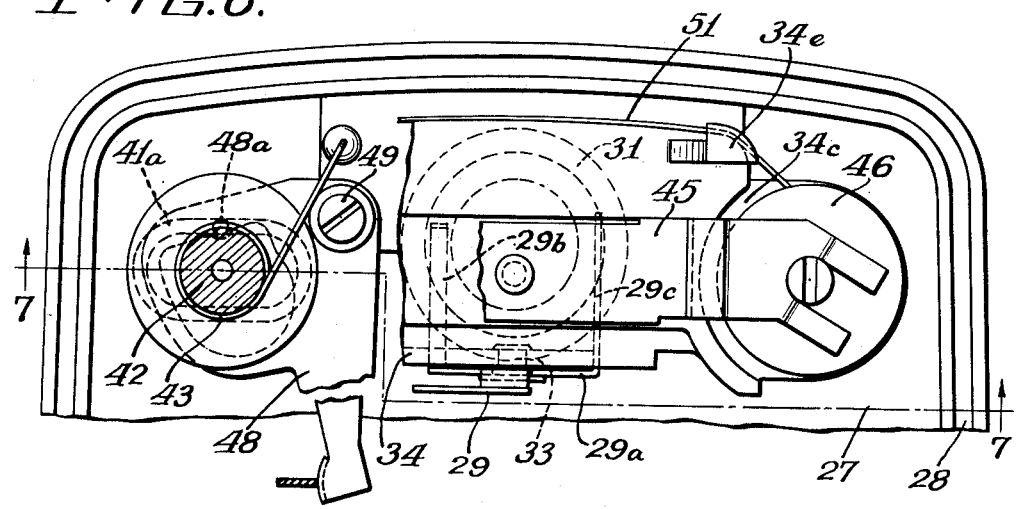
FIG. 6 is a fragmentary, top plan view of the bottom cover and spool holder of the camera shown in FIG. 1 with portion thereof broken away.
Figure 7:
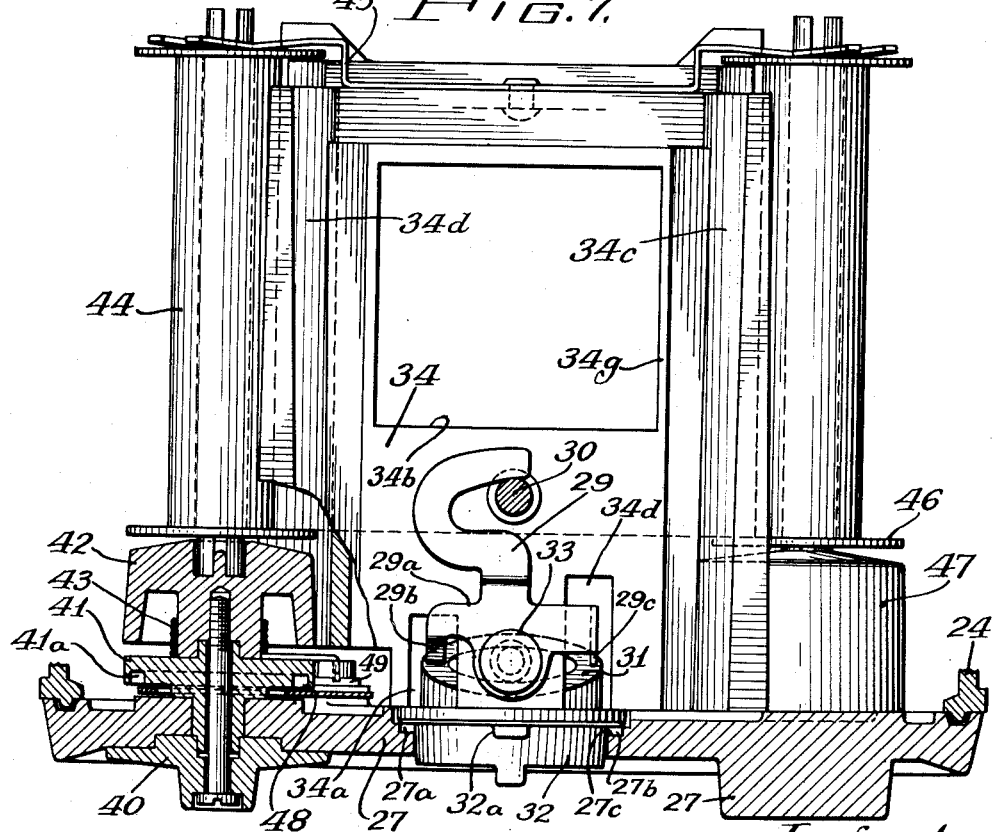
FIG. 7 is a vertical sectional view taken along line 7—7 of FIG. 6.

As best illustrated in FIGS. 3, 6 and 7, film 51 from supply spool 46 extends along a guide 34c of the spool holder or frame 34 and covers the back of a framing aperture or opening 34b. The spool holder 34 is preferably composed of a hard, tough molded plastic material, and has upright recessed members 34h and 34i. Corner guide portions 34e define the upper edge of the guideway 34c while a lower ledge 34f defines the lower edge of the guideway 34a.

Figure 2:
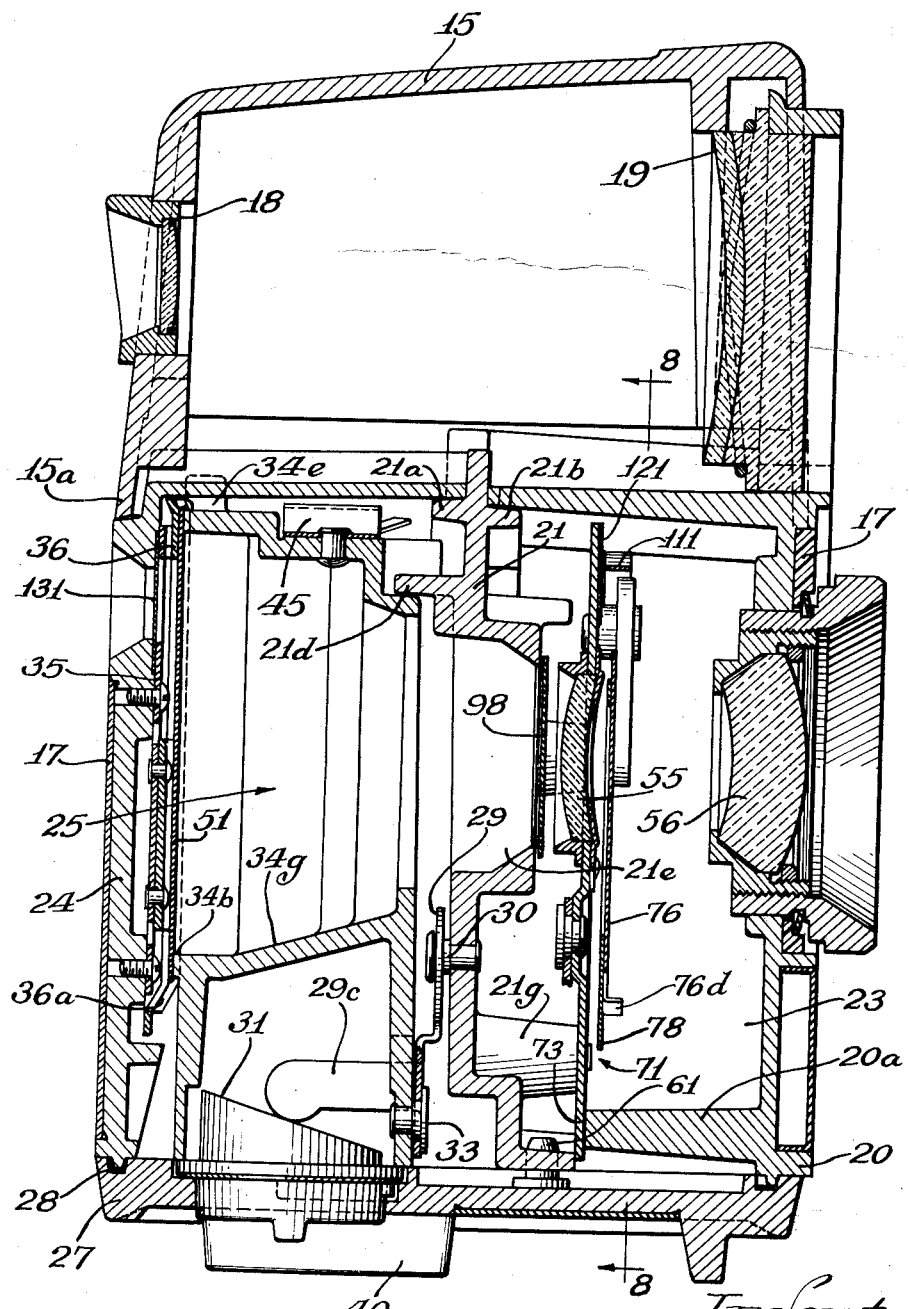
FIG. 2 is a vertical sectional view taken along line 2—2 of FIG. 1.

As illustrated in FIGS. 2 and 3, the rear casing 24 has secured thereto a leaf spring member 35 which engages and presses a curved presser plate 36 to the right to gently urge the film against the spool holder frame 34 and retain the film in the guideway 34c in the frame 34. This action places the film precisely in the focal plane for exposure. Also, the plate 36 has a lower sloping or camming portion 36a to guide the spool holder into the rear chamber formed by the casing member 24 and the wall 21. To facilitate the entrance of the spool holder into this rear chamber the lower portions of a tubular or flange portion 21d of the form of an inverted U act as vertical guide rails which are received loosely in vertical guide grooves 34k as best illustrated in FIG. 3.

The framing or focal plane aperture 34b is at the back end of a tubular light passage 34g which extends at its forward end into the three-sided tubular portion 21d of the vertical wall 21. The tubular portion 21d has top and side walls and is open at the bottom. The portion 21d projects from a tubular light aperture 21e. The light aperture 21e projects forwardly of the wall 21 to a plane near a rear lens 55 of the optical objective of the camera which also includes a front lens 56. For exposure of the frame of the film 51 at the framing aperture 34b, the light travels through the lenses 56 and 55 and through the tunnel defined by the tubular portions 21e and 34g.

In order to locate the spool holder 34 in a position such that the film 51 is in the focal plane of the objective when the spool holder 34 and the base 27 are inserted into the camera, a locating pin 61 (FIG. 12) enters a hole 21f in a ledge 21g. The pin 61 precisely locates the bottom plate or base 27 relative to the lenses 55 and 56, and to locate the spool holder 34 relative to the lenses 55 and 56 so that the film is in the focal plane of the lenses, the spool holder is secured to the bottom plate 27 for adjustment forward and back during the assembly of these elements by screws 63 (FIG. 13) threaded into the spool holder and projecting through slots 64 in the bottom plate 27. The slots extend parallel to the light path and permit the spool holder to be adjusted during manufacture to precisely locate the film plane at the focal plane, after which the screws 63 are tightened to lock the spool holder in adjusted position.

A shutter assembly 71 (FIGS. 1 and 3) is assembled as a unit, and is secured to bosses 21g by screws 72 threaded into tapped bores in a mounting plate 73. A lens mount 74 secures the lens 55 in an opening 73a in the plate 73, the lens mount 74 being fastened by rivets 75 (FIG. 5) to the mounting plate and being spaced slightly from the tubular portion 21e of the wall 21. An overcenter shutter mechanism includes a front or shutter blade 76 pivoted on a pin 77 riveted to the plate 73 and a rear or cover blade 78 pivoted on a pin 79 riveted to the plate 73 at a point closer to the lens 55 than the location of the pin 77, the plate 73 having forwardly projecting embossments 73a (FIGS. 3 and 4) spacing the blade 78 from the front face of the plate 73 and the blade 76 slightly in front of or over the blade 78. A third forwardly projecting embossment 73b with a rivet 79 mounts an actuating and resetting or cocking lever 80 in front of the front shutter blade 76. The upper end of the lever 80 (FIGS. 1 and 11) is slotted at 80a to connect the lever to the blade 76 through a headed pin 81 fixed to the blade 76. A finger 80b (FIG. 5) of the lever 80 extends below the lower edge of the plate 73 and has a latching face 80c and a sloped or cam face 80d. A strong torsion spring 82 bears at one end against a tab 80e (FIG. 1) of the lever 80 and the other end of the spring 82 bears against a forwardly projecting tab 73m. The spring 82 urges the lever 80 in a counterclockwise direction as viewed in FIG. 1.

The shutter is shown in its cocked or reset position in FIG. 1 in which a trigger or latching finger 91a of a lever 91 is engaged by a finger or tab 76a of the front shutter blade 76 and prevents counterclockwise rotation of the blade 76. The tab 76a projects through arcuate slot 73g in the mounting plate 73. In this position, a tension spring 92 connected to a tab 76b of the blade 76 and a pin 93 fixed to the blade 78 urges the blade 78 in a clockwise direction against a tab 73h of the mounting plate 73. In this position, the lever 80 also presses against a tab 94a of latching arm 94 (FIG. 5) to hold the arm 94 out of latching engagement with a tab 91b of the lever 91. The arm 94 is mounted on stud 95 fixed to the plate 73 and a spring 96 urges the arm 94 clockwise, as viewed in FIG. 5. The lever 91 is mounted on stud 97 fixed to the plate 73. In the cocked position of the shutter, a safety shutter blade 98 mounted on stud 99 on plate 73 is in a position covering completely the tubular portion 21e (FIG. 2) of the wall 21 to prevent any entrance of light from the front compartment of the camera to the rear of the wall 21. A bottom 20a (FIG. 1) of the front casing section is provided to prevent passage of light downwardly from the front compartment of the camera. The bottom 20a has a notch 20b through which the lower end 80b of the lever 80 projects.

To expose one frame of the film 51, a front actuating plunger 101 is pressed to the left, as viewed in FIG. 3, manually in a guideway 20c. The plunger pivots a camming arm 102 clockwise, as viewed in FIG. 14, to pivot a T-shaped linking cam 103 counter-clockwise, the arms 102 and 103 being mounted on ears 104 and 105 of the mounting plate 73. The cam 103 presses against a tab 91b of the lever 91 and swings the lever 91 against the action of spring 106 in a clockwise direction as viewed in FIG. 5. During the first portion of this movement of the lever 91, a pushing finger 91c pushes the resetting spring arm 48 down out of the path of the lever 80b and simultaneously swings the safety shutter blade 98 completely out of the light path through a link 107 connecting the shutter blade 98 and the lever 91. Then the latching finger 91a is moved out of engagement with the tab 76a, and the spring-pressed actuating and resetting lever 80 swings the blade 76 rapidly from its cocked position as shown in FIG. 1 through an intermediate position shown in FIG. 8 to its exposing or tripped position as shown in FIG. 9. As the blade 76 reaches the position thereof shown in FIG. 8, it engages a spring contact finger 111 to connect terminal 112 electrically to terminal 113 through the metallic blade 76, pin 77 and plate 73, the contact finger 111 being connected directly to the terminal 112 and mounted in insulated position relative to the terminal 113. This completes a circuit to a flash attachment (not shown) of known construction to start the flash. Then, while the flash is starting to build up, the blade 76 swings on to its open position, the ear 104 acting as a stop to limit movement of the blade 76 beyond its open position. Just before the blade 76 is stopped by the tab 76a engaging the end of the slot 73g, a tab 76d swings a cam 114 of electrical insulating material on stud 115 on plate 73 from the position of the cam 114 shown in FIG. 8 to that shown in FIG. 10. The cam 114 moves from an overcenter position in which the spring 111 engages a flat 114a of the cam 114 to a second overcenter position in which flat 114b engages the spring 111 and holds the spring 111 out of the path of the blade 76 when the blade is moved back to its reset or cocked position, thus preventing accidental firing of a flash bulb inserted before resetting the shutter. It will be noted that lobe-like contacting edge 76e of the blade is of a sufficient length that the blade 76 keeps in contact with the contact 111 until the tab 76d engages depending arm 114c to move the contact 111 to a withdrawn position. This insures a sufficient duration of contact between the contact 111 and the blade 76 to fire the flash bulb. To prevent accidental contact of the contact 111 with the plate 73 while retaining substantial width of the contacting portion of the contact 111, a sheet 121 of electrical insulating material is fixed to the front face of the plate 73 to separate the plate and contact.

Figure 8:
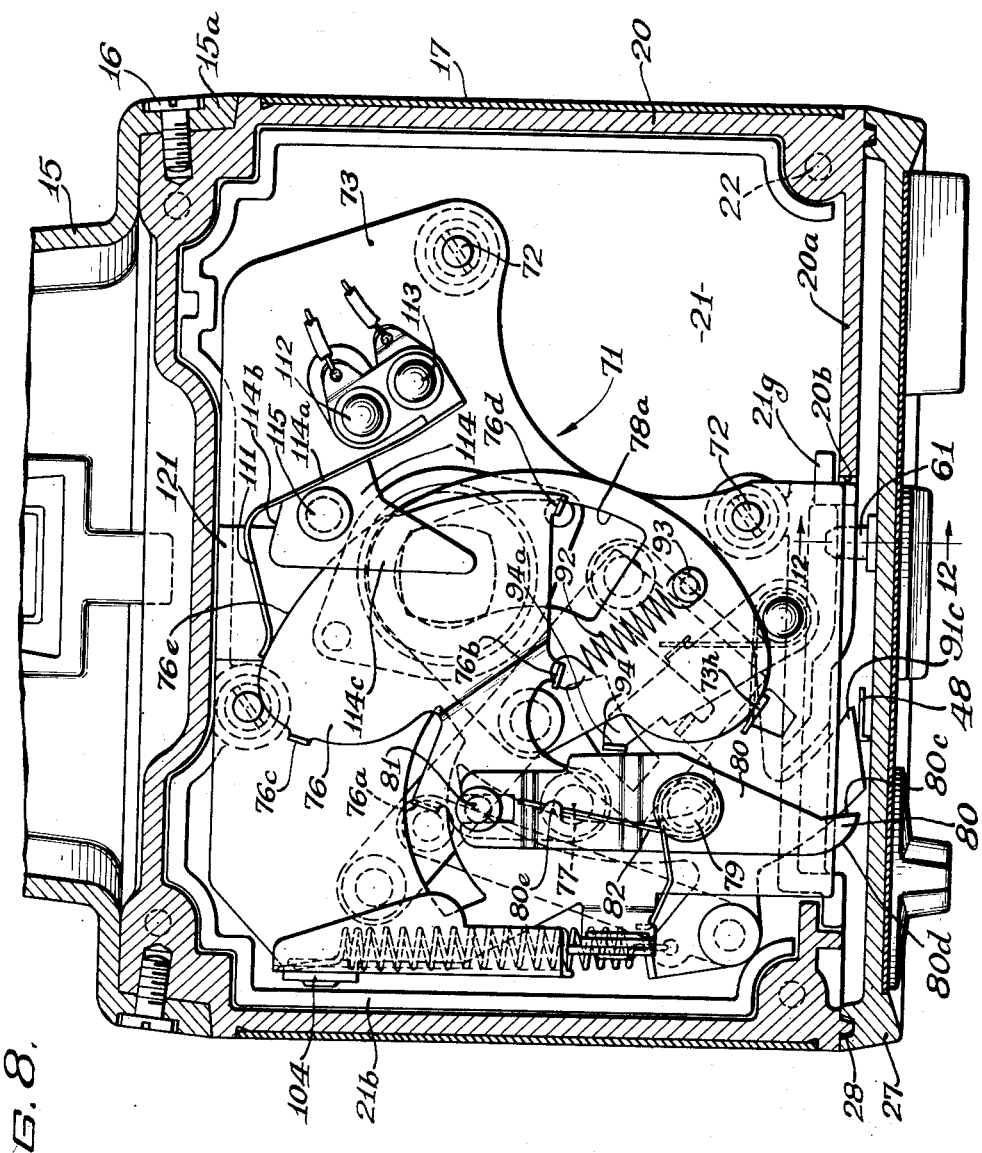
FIG. 8 is a vertical sectional view of the camera taken along line 8—8 of FIG. 2 illustrating the shutter in a cocked or reset position.
Figure 9:
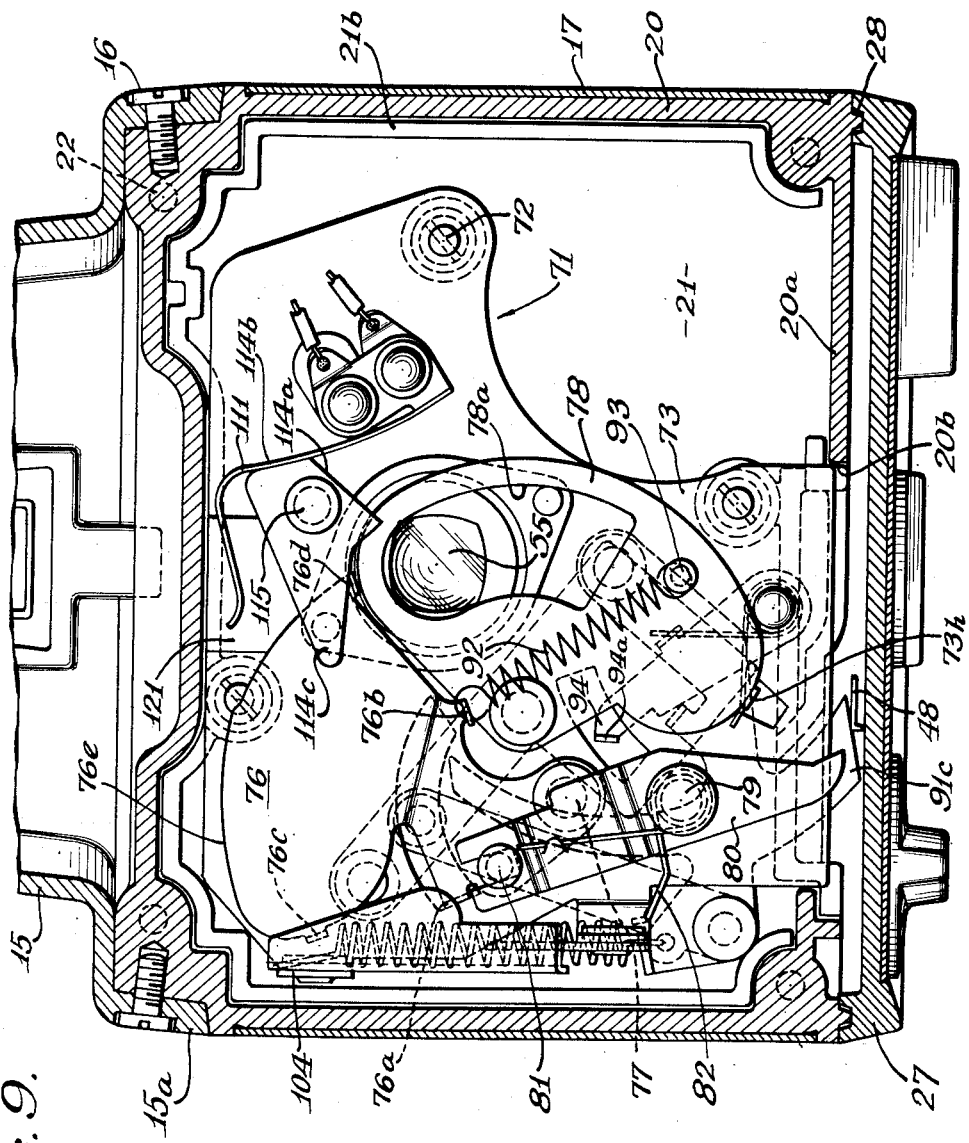
FIG. 9 is a view similar to FIG. 8 and illustrating the shutter during an intermediate point in its operation.

Shortly after the start of movement of the blade 76 in its exposing movement, the blade moves the tab 76b thereof and an end of the tension spring 92 from the positions thereof shown in FIG. 1 overcenter to the positions thereof shown in FIG. 8. In the latter positions, the spring 92 urges rear shutter blade 78 in a counter-clockwise direction to tend to pull the blade 78 with the blade 76 which is moved by the spring 82 and lever 80. However, due to inertia of the blade 78, it does not move appreciably until the blade 76 has opened the light path, but by this time the tension on spring 92 has built up and rapidly swings the shutter blade 78 after the blade 76 to reclose the light path and come to rest in a position in which the stud 93 engages the tab 76d, the tab 76d serving as a rugged bumper to stop the blade 78 as illustrated in FIG. 9. The rear blade 78 overlaps the blade 76 at all times, and has an arcuate exposure slot 78a for exposing the light path between the lenses 55 and 56.

As the blade 76 reaches the end of its exposing movement the lever 80 is moved away from the latching arm 94 (FIG. 5) and the arm 94 moves against the tab 91b. Then, after the user of the camera releases the pushbutton or plunger 101 (FIG. 14), the spring 106 (FIG. 5) pulls the link 107 up to move the lever 91 up and a latching shoulder 94b moves into the path of tab 91b of the lever 91 to prevent actuating movement of the arm lever 91. The lever 107 also moves the safety shutter 98 back into position covering the entrance to the tunnel or light path 21e (FIG. 2) and moves the pushbutton 101 (FIG. 14) back to its reset position. However, at this time, movement of the pushbutton 101 is prevented by the latch-arm 94 so that the user of the camera will be apprised when attempting to push the pushbutton 101 that the film 51 must be moved to present unexposed film to the framing aperture 31. Also, at this time, the safety shutter 98 cannot be moved away from its position blocking the opening 21e in the wall 21.

To reset the shutter mechanism and release the pushbutton 101, the film must be wound to present an unexposed frame of the film at the framing aperture 34b. To transport the film, the knob 40 is turned and indicia on the back of the film is noted through filter 131 (FIG. 2) to apprise the user when the film is wound sufficiently. To wind the film one frame or picture length, the knob 40 must be turned through at least one revolution, and on each revolution thereof, the cocking lever 48 is reciprocated twice. Sometime during the first reciprocation of the lever 48, the lever 48 moves into engagement with the face 80c of the lever 80, and then the lever 48 swings the lever 80 from the position thereof shown in FIG. 11 clockwise to the position of the lever shown in FIG. 1. The lever 80 in so moving swings the blade 76 back from the position of the blade 76 shown in FIG. 11 to the cocked or reset position thereof shown in FIG. 1, and the tab 76a snaps over a cam portion of the finger 91a and is latched in that cocked position by the finger 91a. As the blade 76 is reset, it engages the stud 93 and moves the blade 78 therewith, the spring 92 being moved overcenter near the end of the movement of the blade 78 so that the blade 78 is not pulled ahead of the blade 76 until the blade 76 has completely covered the light path. Also, during the resetting operation, the lever 80 engages the tab 94a and moves the latching arm 94 back out of latching position relative to the lever 91 (FIG. 5). The camera then may be used to take another picture.

While the invention is thus described, it is not wished to be limited to the precise details described, as changes may be readily made without departing from the spirit of the invention.

What is claimed is:

1. In a flash camera, a spring contact member having a contact portion and urged toward an operative position and movable to an inoperative position, a cam member of electrical insulation having a first flat thereon and a second flat thereon, the cam member having an operating arm and movable between a first position in which the contact member engages the first flat and is held thereby in its operative position and a second position in which the contact member engages the second flat and is held thereby in its inoperative position, and conductive shutter blade means movable from a retracted position through an exposure stroke to an actuated position and a return stroke and adapted to contact the contact portion of the contact member when the contact portion is in the operative position thereof, the shutter blade means having a tab for engaging the operating arm to move the cam member to the second position thereof near the end of the exposure stroke and a second tab for engaging the operating arm to move the arm to the first position thereof after the blade means has been moved in its return stroke beyond the contact portion.

2. In a flash camera, an electroconductive shutter blade movable through an exposure stroke from a retracted position to an actuated position and through a return stroke back to the retracted position thereof and having an actuating tab and a resetting tab, a leaf spring contact biased toward a contacting position in the path of the blade as the blade moves through its exposure and return strokes, and a cam member of insulating material movable by the actuating tab of the blade near the end of the actuating stroke from a first position to a second position and movable by the resetting tab of the blade near the end of the return stroke from the second position to the first position, the cam member having a first flat against which the spring contact bears when the cam is in the first position thereof and the spring contact is in the contacting position thereof, the cam also being provided with a second flat for engaging the spring contact when the cam is in the second position thereof, the cam when in the second position thereof serving to hold the spring contact out of the path of the shutter blade.

References Cited in the file of this patent

UNITED STATES PATENTS

| | | |
|---|---|---|
| 2,143,776 | Hickman | Jan. 10, 1939 |
| 2,365,847 | Steiner | Dec. 26, 1944 |
| 2,480,604 | Pirwitz | Aug. 30, 1949 |
| 2,500,034 | Hodges | Mar. 7, 1950 |
| 2,575,121 | Pirwitz | Nov. 13, 1951 |
| 2,627,215 | Pirwitz | Feb. 3, 1953 |
| 2,664,798 | Bolsey | Jan. 5, 1954 |
| 2,715,357 | Gebele | Aug. 16, 1955 |
| 2,762,280 | Von Lowis | Sept. 11, 1956 |
| 2,807,990 | Perlin | Oct. 1, 1957 |